US011984836B2

(12) United States Patent
Ohashi et al.

(10) Patent No.: US 11,984,836 B2
(45) Date of Patent: May 14, 2024

(54) MOTOR CONTROL APPARATUS FOR DETECTING ROTOR POSITIONS OF A PLURALITY OF MOTORS AND IMAGE FORMING APPARATUS

(71) Applicant: CANON KABUSHIKI KAISHA, Tokyo (JP)

(72) Inventors: Eijiro Ohashi, Tokyo (JP); Takuya Miyashita, Kawasaki (JP); Yasukazu Maeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 420 days.

(21) Appl. No.: 17/495,934

(22) Filed: Oct. 7, 2021

(65) Prior Publication Data
US 2022/0029562 A1 Jan. 27, 2022

Related U.S. Application Data

(63) Continuation of application No. 16/743,576, filed on Jan. 15, 2020, now Pat. No. 11,171,583.

(30) Foreign Application Priority Data

Jan. 22, 2019 (JP) ................................ 2019-008597

(51) Int. Cl.
H02P 6/04 (2016.01)
G03G 15/00 (2006.01)
H02P 6/15 (2016.01)
(52) U.S. Cl.
CPC ......... H02P 6/153 (2016.02); G03G 15/6529 (2013.01); H02P 6/04 (2013.01)

(58) Field of Classification Search
CPC ........ H02P 6/04; H02P 6/153; G03G 15/6529
See application file for complete search history.

(56) References Cited

U.S. PATENT DOCUMENTS 8,879,958 B2 * 11/2014 Birumachi ........... G03G 15/757
399/167
2002/0101213 A1 8/2002 Maruyama
(Continued)

FOREIGN PATENT DOCUMENTS

JP 2002-084779 A 3/2002
JP 2007-175135 A 7/2007
(Continued)

OTHER PUBLICATIONS

Japanese Office Action dated Jan. 6, 2023 in counterpart Japanese Patent Appln. No. 2019-008597.

Primary Examiner — Thai T Dinh
(74) Attorney, Agent, or Firm — Venable LLP

(57) ABSTRACT

A motor control apparatus includes: an excitation unit configured to excite a plurality of excitation phases of each of a plurality of motors that include first to Nth motors and a control unit configured to control the excitation unit so as to perform detection excitation processing for sequentially exciting the plurality of excitation phases for each excitation cycle during each excitation period, regarding each of the first to Nth motors, and thereby detect rotor positions of the respective first to Nth motors. When detecting rotor positions of the respective first to Nth motors, the control unit delays a start timing of the detection excitation processing of at least one motor out of the first to Nth motors relative to a start timing of the detection excitation processing of another motor by a period shorter than the excitation period.

12 Claims, 11 Drawing Sheets

(56) References Cited

U.S. PATENT DOCUMENTS

| | | | |
|---|---|---|---|
| 2010/0272485 A1* | 10/2010 | Tsuchiya | H02P 8/22 |
| | | | 399/361 |
| 2015/0145454 A1 | 5/2015 | Kameyama | |
| 2019/0006966 A1* | 1/2019 | Valdivia Guerrero | ....................... |
| | | | H02M 5/4585 |
| 2019/0372489 A1 | 12/2019 | Yamamoto | |
| 2020/0033788 A1 | 1/2020 | Ohashi et al. | |
| 2020/0235684 A1 | 7/2020 | Maeda et al. | |
| 2020/0235689 A1 | 7/2020 | Miyashita et al. | |

FOREIGN PATENT DOCUMENTS

| | | |
|---|---|---|
| JP | 2015-104263 A | 6/2015 |
| JP | 2017-123729 A | 7/2017 |
| JP | 2018-098824 A | 6/2018 |

\* cited by examiner

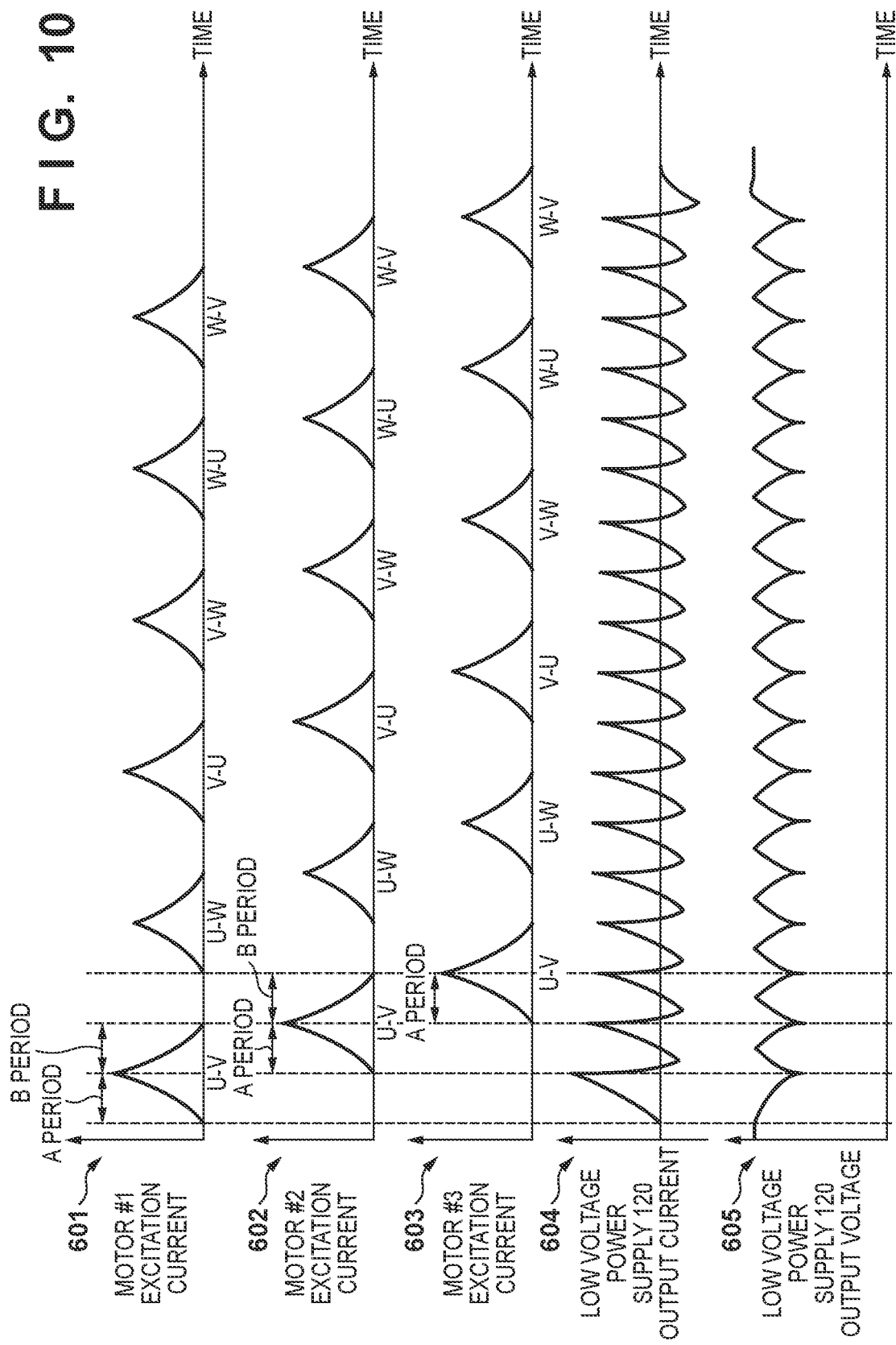

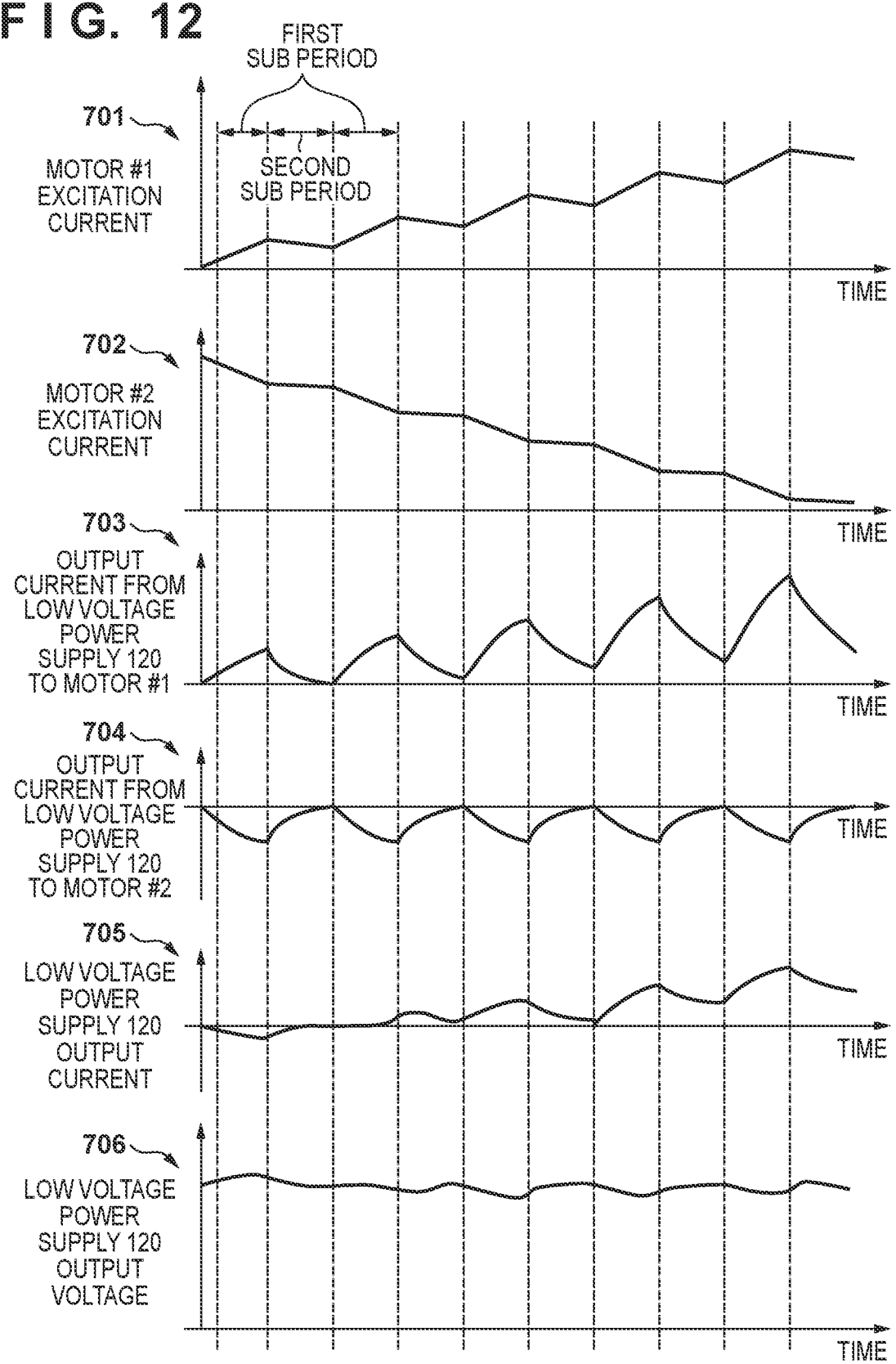

MOTOR CONTROL APPARATUS FOR DETECTING ROTOR POSITIONS OF A PLURALITY OF MOTORS AND IMAGE FORMING APPARATUS

CROSS-REFERENCE TO RELATED APPLICATIONS

The present application is a Continuation of U.S. patent application Ser. No. 16/743,576, filed Jan. 15, 2020, which claims the benefit of Japanese Patent Application Publication No. 2019-008597, filed Jan. 22, 2019, the entire disclosures of which are both hereby incorporated by reference herein.

BACKGROUND OF THE INVENTION

Field of the Invention

The present invention relates to technology for controlling a motor.

Description of the Related Art

A sensorless DC brushless motor that does not have a Hall element is used as a driving source of a rotating member in an image forming apparatus. A sensorless DC brushless motor detects the rotor position using an inductive voltage, but, when the rotor is stopped or rotating at a low speed, cannot detect the rotor position since an inductive voltage is not generated or is small. Therefore, US-2015-145454 discloses a configuration for detecting a rotor position using the fact that the inductance of a coil changes depending on the rotor position.

The configuration in US-2015-145454 is a configuration for determining the inductance of a coil by causing an excitation current to flow in the coil, and detecting the rotor position. Here, if an attempt is made to detect rotor positions of a plurality of motors at the same timing, excitation currents flowing to the respective motors are added, and voltage drop and ripple of the power source that supplies excitation currents to the motors increase. If the rotor positions of the motors are detected sequentially in order to prevent the voltage drop and ripple of the power source from increasing, the detection time of the rotor positions is extended.

SUMMARY OF THE INVENTION

According to an aspect of the present invention, a motor control apparatus includes: an excitation unit configured to excite a plurality of excitation phases of each of a plurality of motors that include first to Nth motors (N is an integer of two or greater), based on an input voltage; and a control unit configured to control the excitation unit so as to perform detection excitation processing for sequentially exciting the plurality of excitation phases for each excitation cycle during each excitation period, regarding each of the first to Nth motors, and thereby detect rotor positions of the respective first to Nth motors, wherein, when detecting rotor positions of the respective first to Nth motors, the control unit delays a start timing of the detection excitation processing of at least one motor out of the first to Nth motors relative to a start timing of the detection excitation processing of another motor by a period shorter than the excitation period.

Further features of the present invention will become apparent from the following description of exemplary embodiments with reference to the attached drawings.

BRIEF DESCRIPTION OF THE DRAWINGS

FIG. 10 is a diagram illustrating position detection excitation processing according to an embodiment.

FIG. 12 is a diagram illustrating position detection excitation processing according to an embodiment.

DESCRIPTION OF THE EMBODIMENTS

Figure 1:
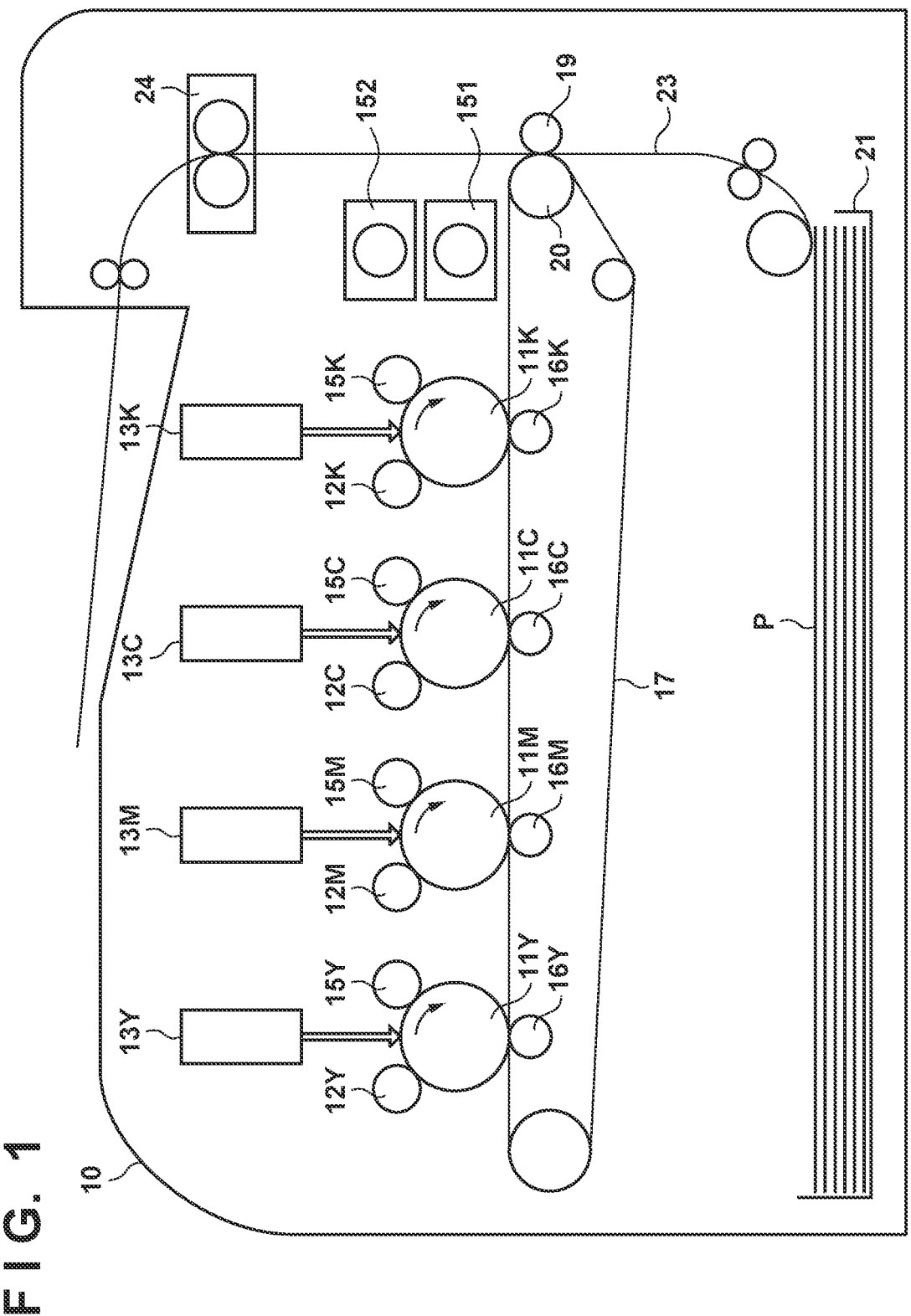
FIG. 1 is a diagram illustrating a configuration of an image forming apparatus according to an embodiment.

Embodiments will be described below in detail with reference to the attached drawings. Note that the following embodiments do not limit the invention according to the scope of the claims. A plurality of features are described in the embodiments, but all of these features are not necessarily essential to the invention, and a plurality of features may be suitably combined. Furthermore, in the attached drawings, the same reference numerals are assigned to the same or similar configurations, and an overlapping description is omitted.

First Embodiment

FIG. 1 shows an image forming apparatus 10 according to this embodiment, which is a printer, a copier, a multi-function peripheral, a facsimile, or the like. The image forming apparatus 10 overlays toner images of four colors, namely yellow (Y), magenta (M), cyan (C), and black (K) to form a full-color image. In FIG. 1, Y, M, C and K at the ends of reference signs indicate that the colors of toner images with which members denoted by the reference signs are involved when the toner images were formed are respectively yellow, magenta, cyan, and black. Note that, in the following description, when it is not necessary to distinguish colors, reference signs without Y, M, C and K at their ends are used. A photosensitive member 11 is driven and rotated in the clockwise direction of the figure when forming an image. A charging unit 12 charges the surface of the photosensitive member 11 to a uniform potential. An exposure unit 13 exposes the surface of the photosensitive member 11 to light so as to form an electrostatic latent image on the photosensitive member 11. A developing roller 15 of a developing unit develops the electrostatic latent image of the photosensitive member 11 using toner by outputting a developing bias, and visualizes it as a toner image. A primary transfer unit 16 transfers the toner image formed on the photosensitive member 11, onto an intermediate transfer belt 17 by applying a primary transfer bias. Note that, as a result of toner images formed on the photosensitive members 11 being overlaid and transferred onto the intermediate transfer belt 17, a full-color image is formed on the intermediate transfer belt 17.

The intermediate transfer belt 17 is driven and rotated in the counter-clockwise direction of the figure by a drive roller 20. Accordingly, the toner image transferred onto the intermediate transfer belt 17 is conveyed to an opposing position of a secondary transfer unit 19. On the other hand, a recording member (sheet) P stored in a cassette 21 is conveyed along a conveyance path 23, and is conveyed to the opposing position of the secondary transfer unit 19. Rollers for conveying the recording member P are provided on the conveyance path 23. The secondary transfer unit 19 transfers the toner image on the intermediate transfer belt 17 onto the recording member P by applying a secondary transfer bias. The recording member P is then conveyed to a fixing device 24. The fixing device 24 applies heat and pressure to the recording member P, and fixes the toner image to the recording member P. After the toner image is fixed, the recording member P is discharged to the outside of the image forming apparatus.

In this embodiment, a motor 151 transmits its drive force to a photosensitive member 11K, a charging unit 12K, a developing roller 15K, a primary transfer unit 16K, and a drive roller 20 via a gear mechanism (not illustrated). A motor 152 transmits its drive force to photosensitive members 11Y, 11M, and 11C, charging units 12Y, 12M, and 12C, developing rollers 15Y, 15M, and 15C, and primary transfer units 16Y, 16M, and 16C via gear mechanisms (not illustrated).

Figure 2:
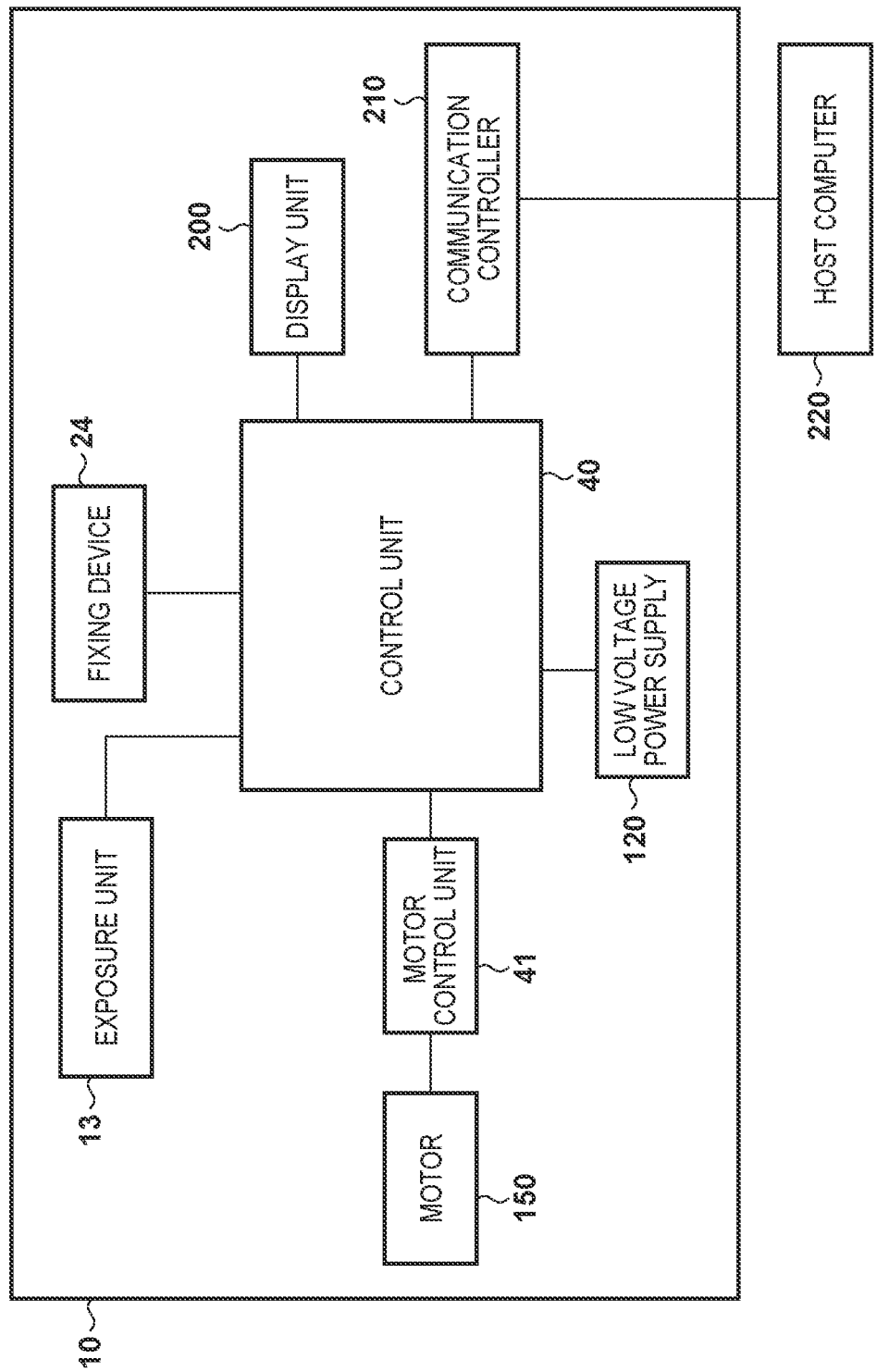
FIG. 2 is a diagram illustrating a control configuration of the image forming apparatus according to an embodiment.

FIG. 2 shows a control configuration of the image forming apparatus. A control unit 40, upon receiving image data of an image to be formed from a host computer 220 via a communication controller 210, starts image formation. When image formation is started, the control unit 40 controls a motor control unit 41 so as to drive and rotate motors 150 that include the motor 151 and the motor 152, and perform rotation drive control of rotating members such as the photosensitive member 11, conveyance control of the recording member P, and the like. The control unit 40 also controls the exposure unit 13 so as to form an electrostatic latent image on the photosensitive member 11. Also, the control unit 40 controls the fixing device 24 so as to fix a toner image onto the recording member P. The control unit 40 displays the state of the image forming apparatus in a display unit 200. Note that the control unit 40 includes a microcomputer and a memory. The memory stores various types of control programs and data, and the microcomputer controls the units of the image forming apparatus 10 based on the various types of control programs and data stored in the memory. A low voltage power supply 120 applies a voltage to the motors 150 that include the motor 151 and the motor 152.

Figure 3:
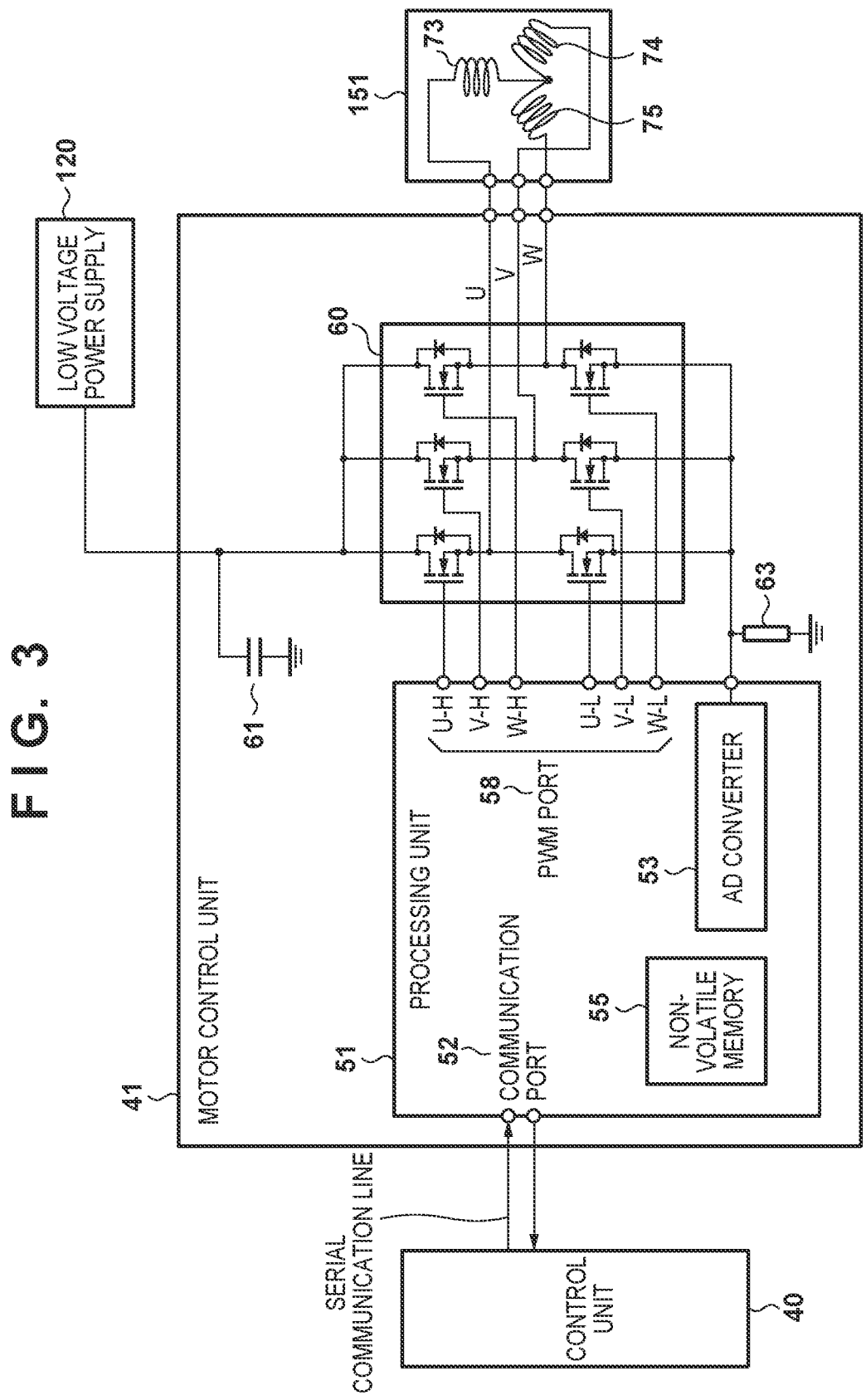
FIG. 3 is a diagram illustrating a configuration of a motor control unit according to an embodiment.

Next, a configuration of the motor control unit 41 that controls the motor 151 will be described with reference to FIG. 3. The motor control unit 41 includes a processing unit 51 realized by a microcomputer and the like. A communication port 52 performs serial data communication with the control unit 40. A nonvolatile memory 55 is a storage unit that stores data to be used for processing that is performed by the processing unit 51, and the like. A pulse width modulation (PWM) port 58 outputs PWM signals for driving switching elements of a three-phase inverter 60. The three-phase inverter 60 includes six switching elements in total, namely three high-side switching elements and three low-side switching elements for respective three phases composed of a U phase, a V phase, and a W phase. Therefore, the PWM port 58 has six terminals corresponding to the switching elements, namely U-H, V-H, W-H, U-L, V-L, and W-L terminals. The switching elements of the three-phase inverter 60 are, for example, FETs, and are driven by the PWM signals output from the corresponding terminals. The three-phase inverter 60 is supplied with a DC voltage from the low voltage power supply 120. As a result of the switching elements of the three-phase inverter 60 being turned on/off using the PWM signals, excitation currents (coil currents) flow through a plurality of coils 73 (U phase), 74 (V phase), and 75 (W phase) of the motor 151. In this manner, the three-phase inverter 60 operates as an excitation unit that excites the motor 151. Note that regeneration diodes for allowing a regenerative current to flow are respectively connected to the switching elements in parallel. In addition, the excitation currents in the coils 73, 74, and 75 are converted into a voltage by a resistor 63, and is input to an AD converter 53 of the processing unit 51, as a value indicating the excitation currents. The AD converter 53 converts the input voltage value (analog value) into a digital value. The processing unit 51 determines the values of the excitation currents based on the digital value output by the AD converter 53. In this manner, the resistor 63, the AD converter 53, and the processing unit 51 operate as a measurement unit that measures excitation currents. A capacitor 61 is provided in order to reduce the ripple of the low voltage power supply 120.

The motor 152 has a configuration similar to the configuration of the motor 151, and a control configuration thereof is also similar. In other words, a three-phase inverter corresponding to the motor 152 is provided, and the processing unit 51 outputs PWM signals from a PWM port, which is not illustrated in FIG. 3, to the three-phase inverter corresponding to the motor 152 as well, and drives the motor 152. Note that the three-phase inverter corresponding to the motor 152 and the three-phase inverter 60 corresponding to the motor 151 are connected to the low voltage power supply 120 in parallel.

Figure 4B:
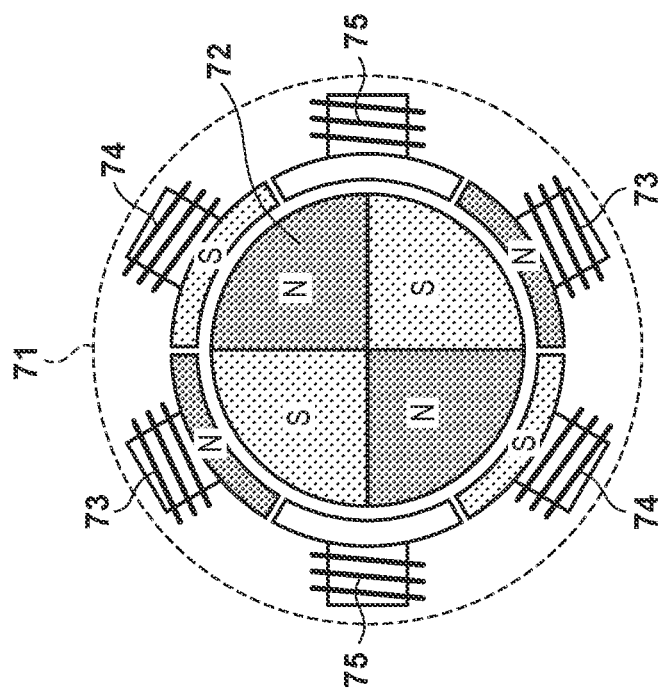
FIGS. 4A and 4B are diagrams illustrating a configuration of a motor according to an embodiment.
Figure 4A:
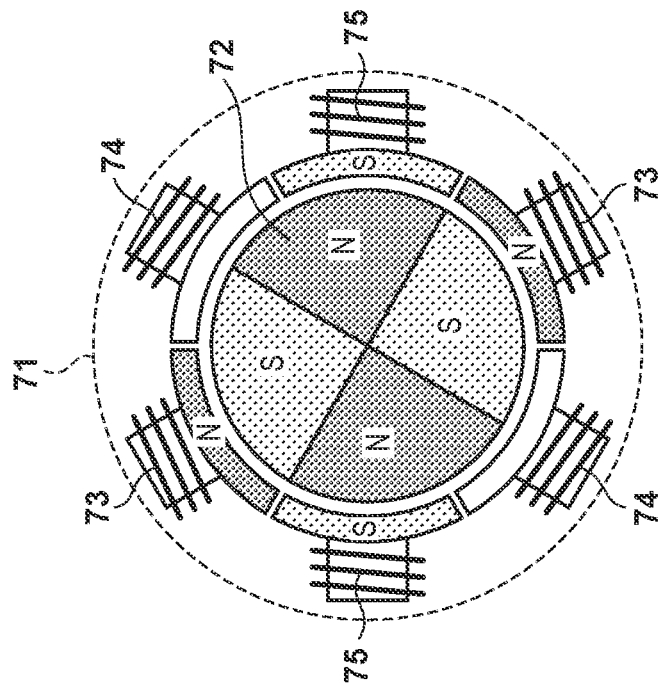

Next, the structure of the motor 151 will be described with reference to FIGS. 4A and 4B. The motor 151 includes a stator 71 having six slots and a rotor 72 having four poles, and the stator 71 includes coils 73, 74, and 75 of three respective phases (U, V, and W). The rotor 72 is constituted by permanent magnets, and includes two sets of N and S poles. The rotational position of the rotor 72 is determined depending on an excitation phase that is being excited. Note that, in the present embodiment, an excitation phase is indicated by a series of two coils out of the plurality of coils 73, 74, and 75. That is, in this embodiment, there are six excitation phases U-V, U-W, V-U, V-W, W-U, and W-V. Note that it is assumed, in this embodiment, that when an X-Y phase is excited, the X-phase coil is an N-pole, and the Y-phase coil is an S pole. Therefore, when the U-V phase is excited, the rotor 72 stops at the rotational position shown in FIG. 4A. In addition, when the U-W phase is excited, the rotor 72 stops at the rotational position shown in FIG. 4B.

Here, in general, a coil such as the coil 73, 74, or 75 has a configuration in which a copper wire is wound around a core that is formed by stacking electrical steel sheets. Also, the magnetic permeability of an electrical steel sheet decreases when an external magnetic field is present. The inductance of a coil is proportional to the magnetic permeability of a core, and therefore when the magnetic permeability of the core decreases, the inductance of the coil also decreases. For example, because the U-phase coil 73 in FIG. 4A opposes only an S pole of the rotor 72, the degree of reduction in inductance of the U-phase coil 73 is larger than that of the W-phase coil 75 that opposes both an S pole and an N pole of the rotor 72. Also, the amount of change in inductance differs depending on whether or not the direction of a magnetic field generated by an excitation current is the same as the direction of an external magnetic field. Specifically, when, in a state in FIG. 4A, an excitation current is caused to flow in the U-phase coil 73 so as to generate a magnetic field whose direction is the same as the direction of a magnetic field generated by the opposing S pole of the rotor 72, that is, the U phase is an N pole, the amount of reduction in inductance increases relative to a case where an excitation current is caused to flow in a direction such that the U phase is an S pole. In this manner, a detected inductance differs depending on the stopping position of the rotor 72 and an excitation phase.

Figure 5:
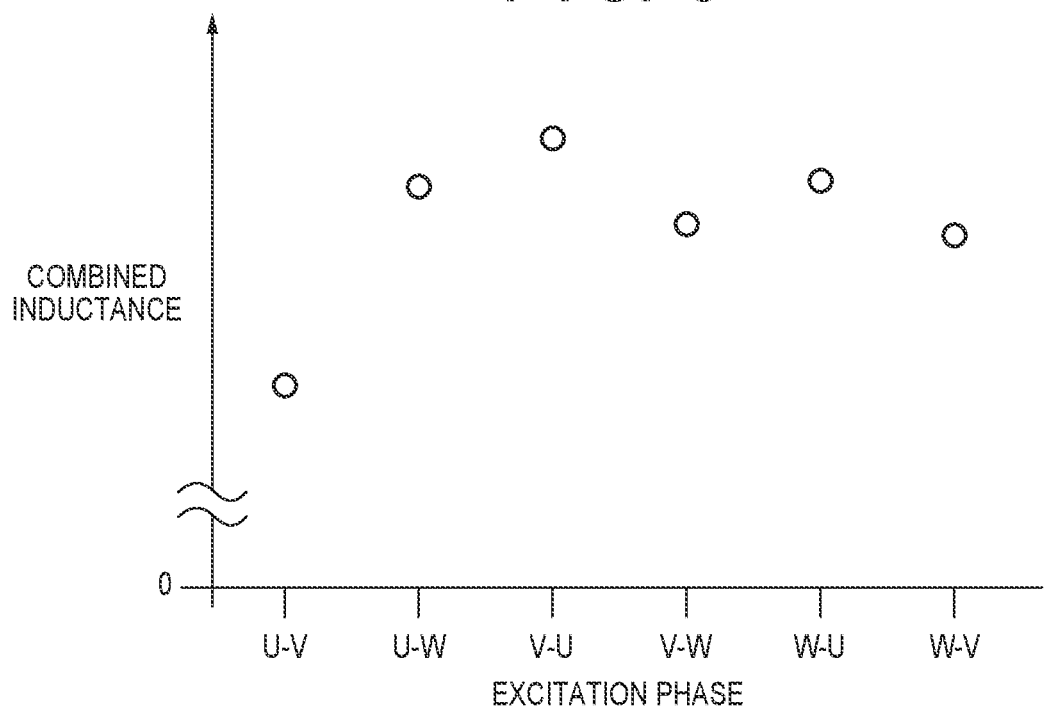
FIG. 5 is a diagram illustrating a relationship between an excitation phase and a combined inductance according to an embodiment.

FIG. 5 shows an example of combined inductances at the respective excitation phases when the rotor 72 is stopped. Note that FIG. 5 shows combined inductances when the rotor 72 is at a position at which the rotor 72 stops when the U-V phase is excited. Hereinafter, the position at which the rotor 72 stops when an X-Y phase is excited is referred to as a "position at the X-Y phase". Since the rotor 72 is stopped at the position at the U-V phase, the combined inductance when the U-V phase is excited is smaller than the combined inductance when other phases are excited. Therefore, if the relative magnitudes of the combined inductance (combined impedances) of the respective excitation phases are known, the position of the rotor 72 can be determined.

In the present embodiment, the excitation phases are sequentially excited, relative magnitudes of inductances at the respective excitation phases are determined using the excitation currents that flowed when the respective excitation phases were excited, and the rotor position is detected from the determined result. In the following description, processing for exciting excitation phases in accordance with a predetermined order in order to detect the rotor position is referred to as "position detection excitation processing". Note that, in position detection excitation processing, excitation of excitation phases is divided into a former half period (hereinafter, referred to as "A period") and a latter half period (hereinafter, referred to as "B period"). For example, when exciting the U-V phase, a PWM signal having a duty ratio of 50% is output from the U-H terminal during the A period. Also, during the A period, a PWM signal is output from the U-L terminal as well. Note that, while the PWM signal from the U-H terminal is at a high level, the PWM signal from the U-L terminal is kept at a low level, and while the PWM signal from the U-H terminal is at the low level, the PWM signal from the U-L terminal is kept at the high level.

Furthermore, during the A period, the V-L terminal is kept at the high level (duty ratio is 100%), and the other terminals are kept at the low level (duty ratio is 0%). Therefore, while the PWM signal from the U-H terminal is at the high level, a current flows from the low voltage power supply 120 to the high-side switching element of the U phase, the coils 73 (U phase) and 74 (V phase), and the low-side switching element of the V phase. Also, while the PWM signal from the U-H terminal is at the low level, a current (regenerative current) flows through the low-side switching element of the U phase, the coils 73 (U phase) and 74 (V phase), and the low-side switching element of the V phase.

During the B period that follows the A period, a PWM signal having a duty ratio of 50% is output from the V-H terminal. In addition, similar to the A period, during the B period, a PWM signal with logic inverted to that of the V-H terminal is output from the V-L terminal. Note that, during the B period, the U-L terminal is kept at the high level (duty ratio is 100%), and the other terminals are kept at the low level (duty ratio is 0%). Therefore, while the PWM signal from the V-H terminal is at the high level, a current flows through the low-side switching element of the U phase, the coils 73 (U phase) and 74 (V phase), and the high-side switching element of the V phase. In addition, while the PWM signal from the V-H terminal is at the low level, a current (regenerative current) flows through the low-side switching element of the U phase, the coils 73 (U phase) and 74 (V phase), and the low-side switching element of the V phase. Note that an excitation current increases during the A period, and an excitation current decreases during the B period. The durations of the A period and the B period are determined, with the period during which the rotor 72 will not start rotating being the upper limit, based on the required detection accuracy. In this example, the durations are each set to 0.5 ms.

Figure 6A:
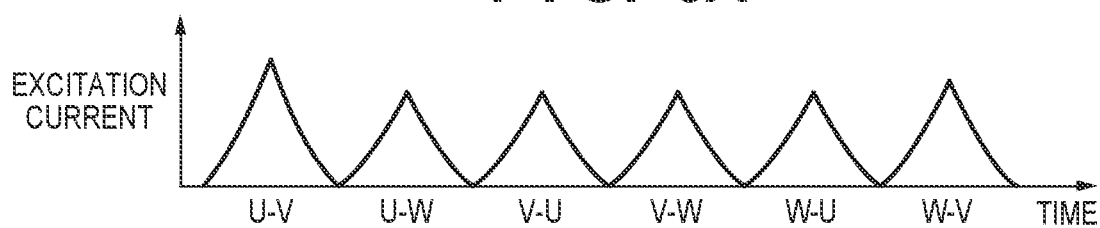
FIG. 6A is a diagram illustrating a time waveform of an excitation current according to an embodiment.

FIG. 6A shows an excitation current when position detection excitation processing is performed on one motor, namely the motor 151. During a period during which the duty ratio of a PWM signal is constant, the inductance of a coil changes according to the magnitude of the excitation current. Therefore, as shown in FIG. 6A, the excitation current increases curvedly during the A period, and decrease curvedly during the B period. The processing unit 51 detects the peak values of excitation currents when the respective excitation phases are excited, and, accordingly, determines and compares the degrees of reduction in combined inductances of the respective excitation phases, thereby detecting the position of the rotor 72. Note that a larger peak value of an excitation current indicates a smaller combined inductance.

Figure 6B:
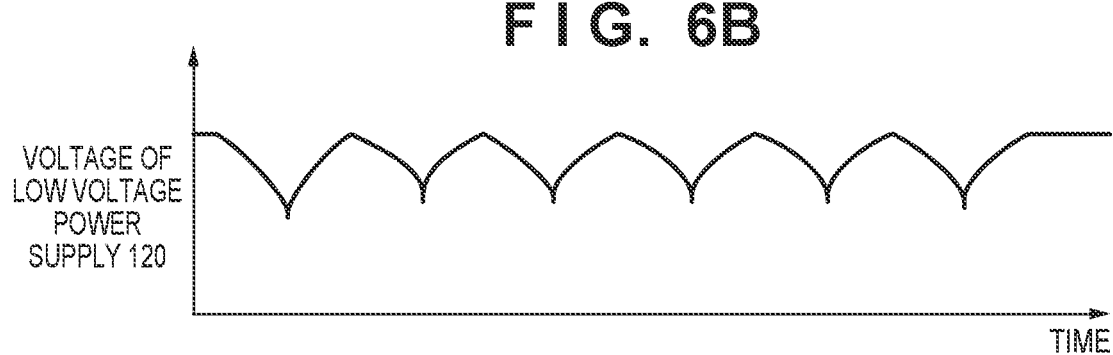
FIG. 6B is a diagram illustrating a time waveform of an output voltage of a low voltage power supply according to an embodiment.

FIG. 6B shows an output voltage of the low voltage power supply 120 when position detection excitation processing is performed on one motor, namely the motor 151. As shown in FIG. 6B, ripple arises in an output voltage of the low voltage power supply 120 due to a change in a current output from the low voltage power supply 120. As a method for reducing this ripple, a method for increasing the capacitance of a capacitor provided in the low voltage power supply 120 and a method for decreasing the impedance by increasing the thickness of the wire between the motor 151 and the low voltage power supply 120 are conceivable, for example. However, in such a method, the sizes of the motor control unit 41 and the low voltage power supply 120 increases. In particular, if an attempt is made to detect the rotor positions of a plurality of motors at the same time, a current supplied from the low voltage power supply 120 increases, and thus the ripple of an output voltage of the low voltage power supply 120 also increases. In addition, the total of excitation currents also increases, and thus outputs of the low voltage power supply 120 need to be high.

Figure 7:
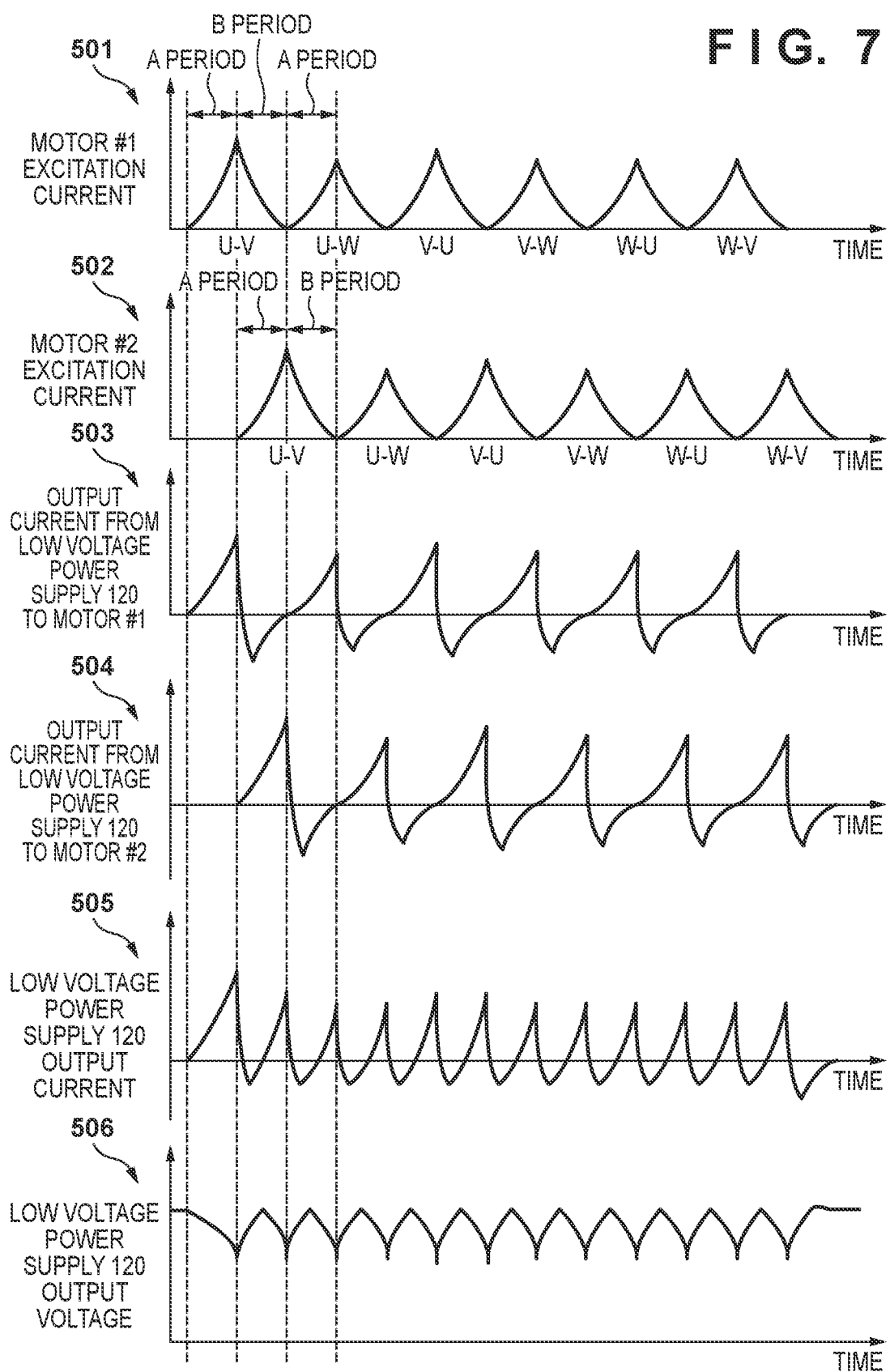
FIG. 7 is a diagram illustrating position detection excitation processing according to an embodiment.

FIG. 7 is a diagram illustrating position detection excitation processing that is performed on two motors, namely the motors 151 and 152. Note that, in the following description, the motor 151 is also referred to as a motor #1, and the motor 152 is also referred to as a motor #2. Reference numerals 501 and 502 in FIG. 7 respectively indicate excitation currents of the motor #1 and the motor #2. As shown in FIG. 7, in this embodiment, excitation of the motor #2 is delayed relative to that of the motor #1 by a half cycle. Therefore, except for the A period of excitation of the U-V phase of the motor #1 and the B period of excitation of the W-V phase of the motor #2, the B period of the motor #1 and the A period of the motor #2 match, and the A period of the motor #1 and the B period of the motor #2 match. Reference numerals 503 and 504 in FIG. 7 respectively indicate a current supplied from the low voltage power supply 120 to the motor #1 and a current supplied from the low voltage power supply 120 to the motor #2. For example, during the B period of excitation of the U-V phase, while the high-side switching element of the V phase is on, a current that flowed to the coil 74 flows toward the low voltage power supply 120 via the high-side switching element of the V phase, and thus a current from the low voltage power supply 120 takes a negative value. Reference numeral 505 in FIG. 7 is acquired by totaling currents indicated as reference numerals 503 and 504, and indicates an actual output current of the low voltage power supply 120. As indicated by reference numeral 505, output currents to the motors cancel each other, and a change in the output current of the low voltage power supply 120 is smaller than changes in the output currents to the motors indicated by reference numerals 503 and 504. Therefore, as indicated by reference numeral 506, the ripple of the output voltage of the low voltage power supply 120 decreases.

Figure 8:
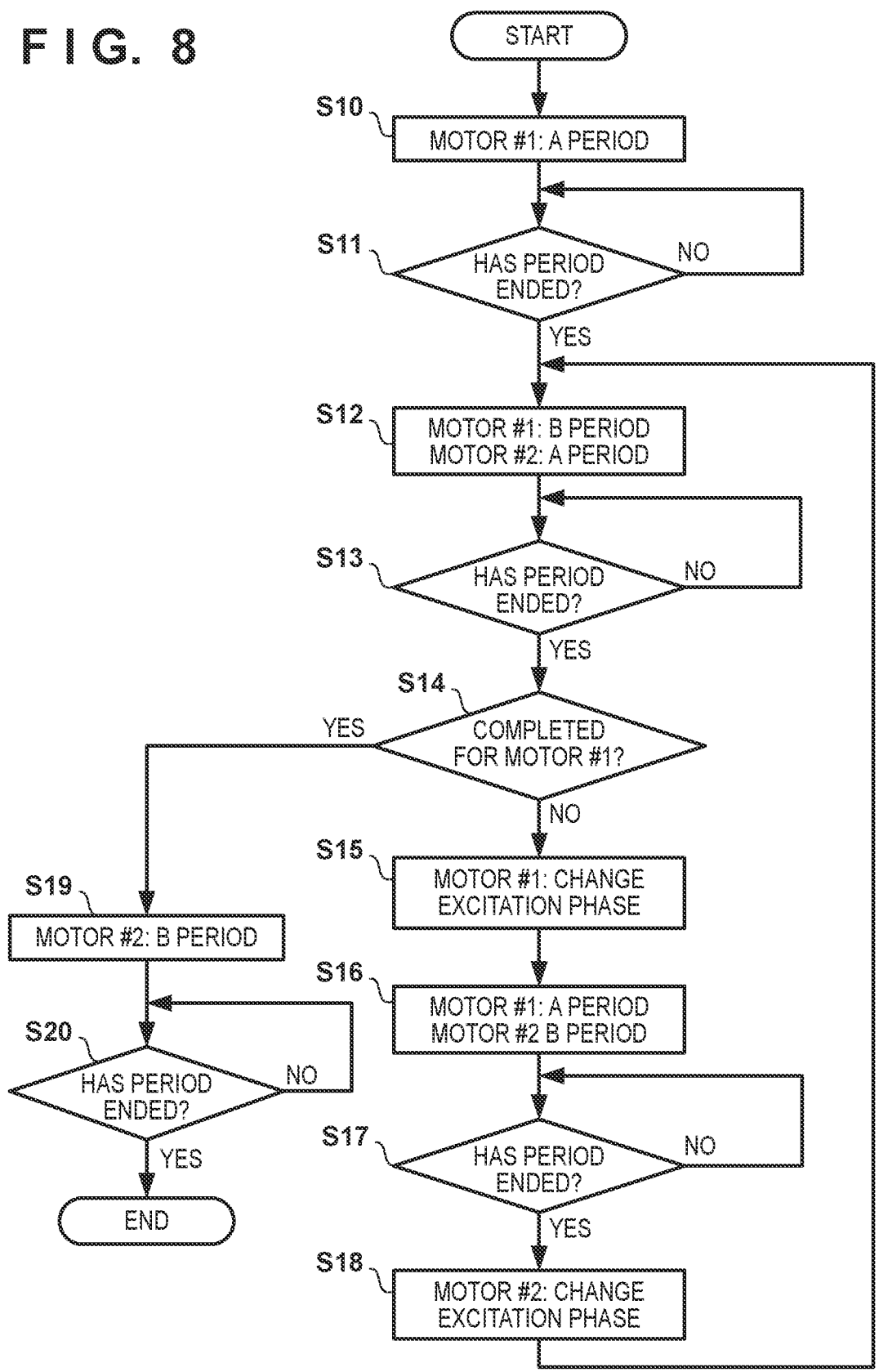
FIG. 8 is a flowchart of detection processing of rotor positions according to an embodiment.

FIG. 8 is a flowchart of position detection processing of the rotors 72 of the two motors #1 and #2 according to this embodiment, which is executed by the processing unit 51. Note that, in the flowchart in FIG. 8, "period" is a general term for the A period and B period. In step S10, the processing unit 51 starts excitation of a first excitation phase for the A period regarding the motor #1, and, in step S11, waits until the A period ends. When the A period ends, in step S12, the processing unit 51 starts excitation for the B period regarding the motor #1, and starts excitation for the A period regarding the motor #2, and, in step S13, waits until the period ends. When the period ends, the processing unit 51 determines in step S14 whether or not excitation of all of the excitation phases of the motor #1 is complete. If excitation of all of the excitation phases of the motor #1 is not complete, the processing unit 51 changes excitation phases of the motor #1, in step S15. Subsequently, in step S16, the processing unit 51 starts excitation for the A period regarding the motor #1, and starts excitation for the B period regarding the motor #2, and, in step S17, waits until the period ends. When the period ends, the processing unit 51 changes, in step S18, excitation phase of the motor #2, and repeats the processing of step S12 onward. On the other hand, in step S14, if excitation of all of the excitation phases of the motor #1 is complete, the processing unit 51 starts, in step S19, excitation of the last excitation phase for the B period regarding the motor #2, and, in step S20, waits until the B period ends. When the B period ends, the processing unit 51 ends the processing in FIG. 8. Subsequently, the processing unit 51 determines the positions of the rotors 72 of the motor #1 and the motor #2, based on the peak values of excitation currents in the respective excitation phases.

With the above configuration, it is possible to reduce the voltage drop and ripple of the low voltage power supply 120 when detecting rotor positions of a plurality of motors. In addition, since rotor positions of a plurality of motors are detected in parallel, it is possible to shorten the detection time compared with a method in which detection processing of one motor is executed, and detection processing of the next motor is then started.

Note that, in this embodiment, the A period of one motor and the B period of the other motor start at the same timing, but the start timings do not need to be the same. For example, by providing an overlapping period of the A period of one motor and the B period of the other motor, it is possible to reduce the voltage drop and ripple of the low voltage power supply 120 compared with a case where the A period of the one motor and the A period of the other motor matches. Specifically, assume that excitation of a first excitation phase of the motor #1 is started at a first timing, and excitation of a second excitation phase to be excited after the first excitation phase of the motor #1 is started at a second timing. In this case, a configuration can be adopted in which excitation of a certain excitation phase of the motor #2 is started at a third timing that is later than the first timing and earlier than the second timing. Note that FIG. 7 shows a case where a timing when excitation of the first excitation phase of the motor #1 switches from the A period to the B period is defined as the third timing.

In addition, in this embodiment, the duty ratio of a PWM signal is constant during the A period and the B period, but the duty ratio can be changed between the A period and B period. For example, during the A period and B period, the duty ratio of a PWM signal can be changed sinusoidally. Note that, when the duty ratio of a PWM signal is changed sinusoidally, the duty ratio is set to be 0 at the beginning and end of the period, and is changed to be largest in an intermediate point. In addition, during each of the A period and B period, the duty of a PWM signal can also be changed in a triangular waveform or a trapezoidal waveform. In addition, according to this embodiment, an excitation current is caused to flow in two out of three phases, but three phases can be excited at the same time. In addition, in this embodiment, the excitation phases are excited continuously, but a period during which no excitation phase is excited can be provided when changing excitation phases.

Figure 9A:
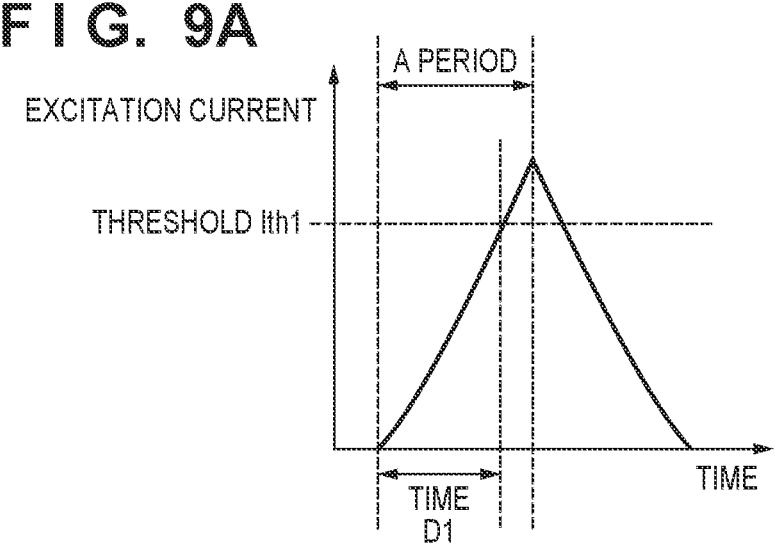
FIGS. 9A to 9C are diagrams illustrating a measurement target according to an embodiment.
Figure 9B:
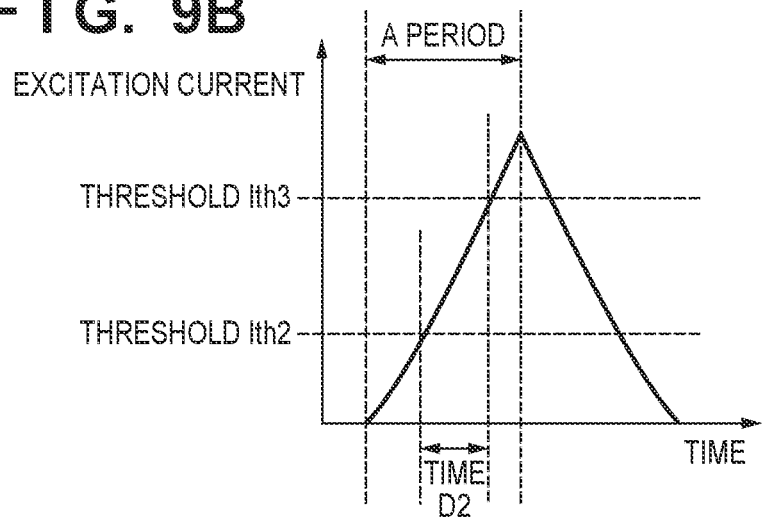
Figure 9C:
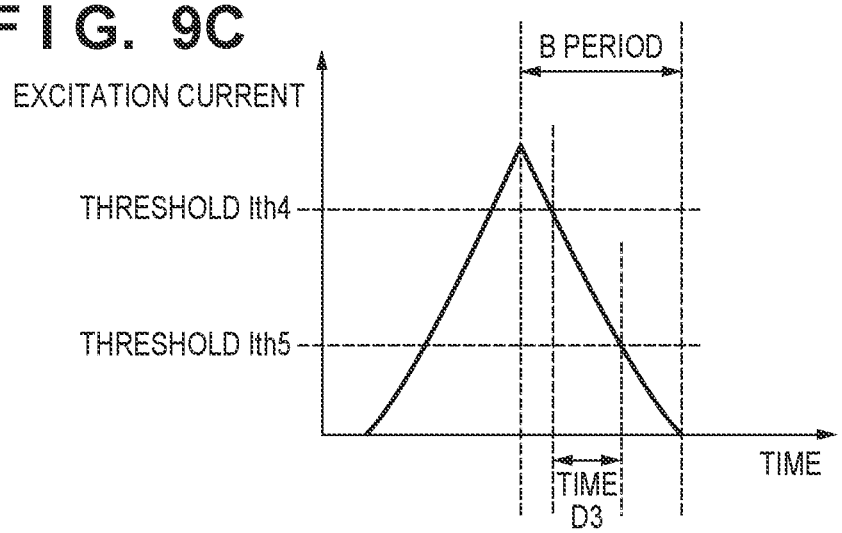

In addition, in this embodiment, the inductance of a coil is determined by detecting the peak value of an excitation current, and the rotor position is thereby detected. Accordingly, in this embodiment, a peak value of an excitation current when excitation is performed for a predetermined time is used as a physical amount that changes according to a change in the inductance of a coil. However, it suffices for the physical amount that is detected to be an amount that changes according to a change in the inductance, and is not limited to a peak value of an excitation current. For example, an inductance can be detected using the rate of change in an excitation current. For example, as shown in FIG. 9A, by measuring a time D1 from when a PWM signal is output during the A period until when a current value reaches a predetermined threshold Ith1, the rate of a change in the excitation current can be detected. Also, as shown in FIG. 9B, by measuring a time D2 from when an excitation current reaches a predetermined threshold Ith2 after a PWM signal is output during the A period until when the excitation current reaches a threshold value Ith3, the rate of a change in the excitation current can be detected. Furthermore, as shown in FIG. 9C, by measuring a time D3 from when an excitation current reaches a predetermined threshold Ith4 after a PWM signal is output during the B period until when the excitation current reaches a threshold Ith5, the rate of a change in the excitation current can be detected.

Second Embodiment

Next, a second embodiment will be described with a focus on differences from the first embodiment. In this embodiment, the image forming apparatus 10 performs detection processing of rotor positions of three or more motors in parallel. First, a case will be described in which detection processes of rotor positions of three motors, namely three motors #1, #2, and #3 are performed in parallel. As indicated by reference numerals 601 to 603 in FIG. 10, in this embodiment, a start timing of position detection excitation processing of the motor #2 is delayed relative to that of the motor #1 by the same length as the length of the A period, and a start timing of position detection excitation processing of the motor #3 is delayed relative to that of the motor #2 by the same length as the length of the A period. In addition, a non-excitation period during which excitation is not performed is provided when changing excitation phases. The length of the non-excitation period is the same as the A period and the B period. Specifically, assume that two motors out of three are excited at the same time, and while the A period is applied to one of the two motors to be excited, the B period is applied to the other motor. Accordingly, changes in currents that are output from the low voltage power supply 120 to the two motors cancel each other, and change in an output current of the low voltage power supply 120 is smaller than the changes in the output currents to the motors, as indicated by reference numeral 604. Therefore, as indicated by reference numeral 605, the ripple of the output voltage of the low voltage power supply 120 also decreases.

Figure 11:
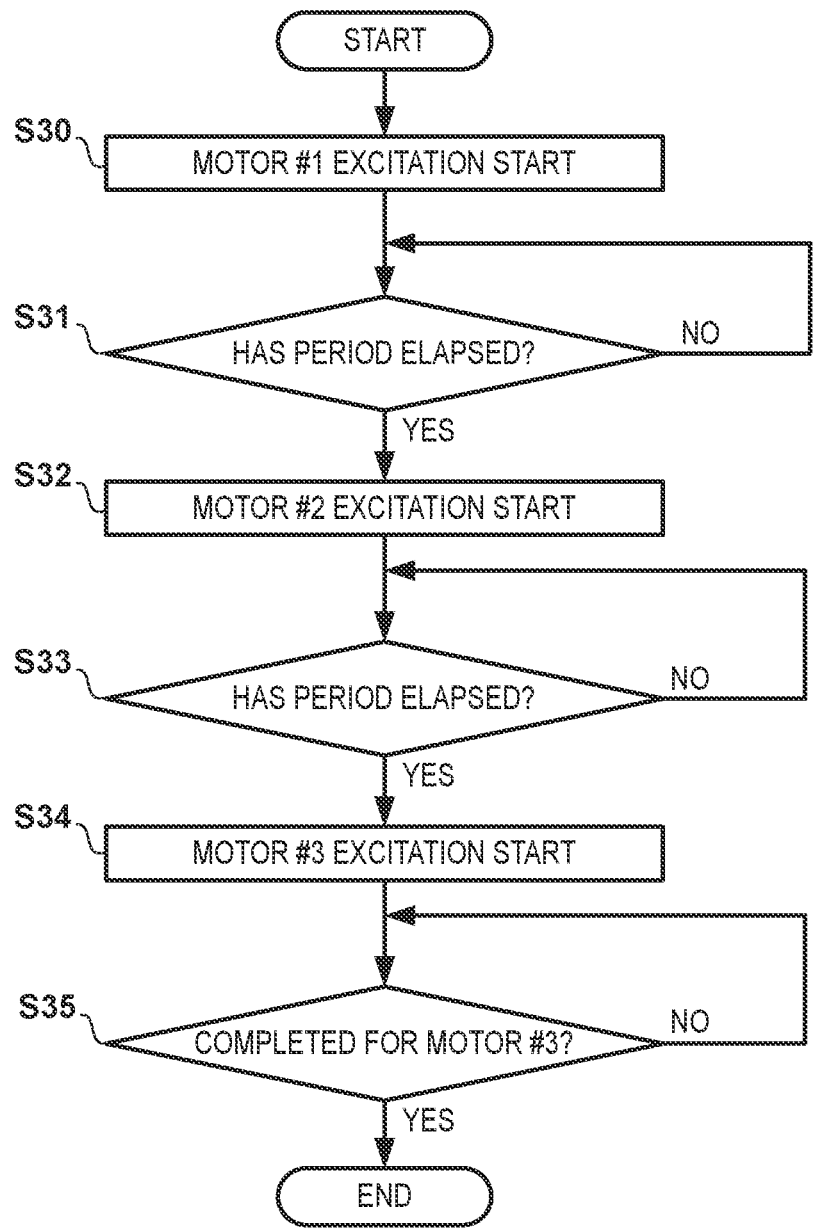
FIG. 11 is a flowchart of detection processing of rotor positions according to an embodiment.

FIG. 11 is a flowchart of position detection processing of the rotors 72 according to this embodiment, which is executed by the processing unit 51. In step S30, the processing unit 51 starts excitation for the motor #1, and, in step S31, waits for a period corresponding to the A period. Note that, when excitation for the motor #1 is started, the processing unit 51 excites six excitation phases sequentially as indicated by reference numeral 601 in FIG. 10. Note that the non-excitation period is provided when switching excitation phases. When a period corresponding to the A period has elapsed after excitation for the motor #1 is started, the processing unit 51 starts excitation for the motor #2 in step S32, and, in step S33, waits for a period corresponding to the A period. Note that, when starting excitation for the motor #2, the processing unit 51 sequentially excites the six excitation phases as indicated by reference numeral 602 in FIG. 10. Note that when switching between excitation phases is performed, the non-excitation period is provided. When the period corresponding to the A period has elapsed, the processing unit 51 starts excitation for the motor #3 in step S34, and starts excitation for the motor #3 in step S35. Note that, when excitation for the motor #3 is started, the processing unit 51 sequentially performs excitation of the six excitation phases as indicated by reference numeral 603 in FIG. 10. Note that, when switching between excitation phases is performed, the non-excitation period is provided. When excitation for the motor #3 is started, the processing unit 51 waits, in step S35, until excitation of all of the excitation phases of the motor #3 is complete. When excitation of all of the excitation phases of the motor #3 is complete, the processing unit 51 ends the procedure in FIG. 11, and determines the positions of the rotors 72 of the motors #1 to #3 based on the peak values of excitation currents in the respective excitation phases.

In this embodiment, timings for starting the A period or the B period of the three motors are the same. However, in this embodiment, the start timings are not limited to the same timing, and may be different timings.

Note that the method for detecting the positions of rotors of three motors in parallel has been described in detail with reference to FIGS. 10 and 11, but rotor positions of four or more motors can be detected in parallel using a similar method. To be more general, a case will be described below in which position detection excitation processes for first to Nth motors (N is an integer of 2 or larger) from among a plurality of motors that operate using an input voltage from the low voltage power supply 120 are performed in parallel.

First, the excitation order of excitation phases in position detection excitation processing of each of the motors can be arbitrarily set. Accordingly, all of the excitation orders of excitation phases in position detection excitation processing of the respective motors may be the same or different, or the same orders and different orders may be included. For example, a configuration can be adopted in which excitation is performed on (N−1) motors from among N motors in the same order, but excitation is performed on one motor in a different order. Note that the excitation phases are excited during an excitation period only. The excitation period is the sum of the A period and the B period. In addition, excitation of the excitation phases is started for each excitation cycle. In the example in FIG. 10 in which N equals 3, the excitation cycle is the sum of the excitation period and the non-excitation period. Since N equals 3 in the example in FIG. 10, the non-excitation period is equal to each of the A period and the B period, and is half of the excitation period. However, more generally, the non-excitation period can be a period acquired by multiplying a period that is half of the excitation period by (N−2). Note that, in the example in FIG. 7 of the first embodiment in which N equals 2, the non-excitation period is 0, and the excitation period and the excitation cycle are equal.

When performing processing for detecting the rotor positions of the first to Nth motors, the processing unit 51 delays a start timing of position detection excitation processing for at least one motor relative to a start timing of position detection excitation processing for at least another motor. Note that a period by which the start timing is delayed is set to be a period shorter than the excitation period. In other words, the processing unit 51 performs control such that the B period of at least one motor and the A period of another motor include an overlapping period. Accordingly, it is possible to suppress the ripple of the low voltage power supply 120 compared with a case where the start timings of position detection excitation processing for the first to Nth motors are the same. Note that, for example, by setting the B period of at least one motor to match the A period of another motor, it is possible to further suppress the ripple of the low voltage power supply 120.

In addition, a configuration can be adopted in which start timings of position detection excitation processing of the first to Nth motors are set to be different in order to further suppress the ripple of the low voltage power supply 120. For example, after starting position detection excitation processing of a k-th motor (k is an integer of 1 to N−1), the processing unit 51 starts position detection excitation processing of a (k+1)th motor. At this time, the processing unit 51 sets a period from when position detection excitation processing of the first motor is started until when position detection excitation processing of the Nth motor is started to be smaller than the excitation cycle. With this configuration, it is possible to suppress the ripple of the low voltage power supply 120 while preventing the time until when position detection excitation processing of all of the motors ends from increasing. In addition, for example, the processing unit 51 starts position detection excitation processing on the first to Nth motors such that the B period of the k-th motor and the A period of the (k+1)th motor include an overlapping period. With this configuration, output currents from the low voltage power supply 120 to the motors are effectively canceled, and it is possible to suppress the ripple of the low voltage power supply 120. In the example in FIG. 10, a start timing of position detection excitation processing of the (k+1)th motor is delayed relative to a start timing of position detection excitation processing of the k-th motor by the A period (=the B period). Note that the excitation period in position detection excitation processing may be the same for all of the motors, or may be different for each of the motors. Similarly, the excitation cycle may be the same for all of the motors, or may be different for each of the motors.

In this embodiment, the non-excitation period is provided when switching between excitation phases of each of the motors is performed. Due to the non-excitation period, the excitation current further approximates a substantially-zero state. If excitation of the next excitation phase is started in a state where an excitation current flows, a current value in the measurement is affected. Therefore, as in this embodiment, the detection accuracy of an excitation current can be improved by starting excitation of the next excitation phase after the non-excitation period has elapsed. As a result, the detection accuracy of the inductance of the coil improves, and the accuracy of rotor position detection can also be improved. Alternatively, if there is a waiting time until the excitation current reaches substantially zero, coils of another motor are excited during the waiting time, and thus the entire detection time of the rotor positions can be shortened.

As described above, in position detection processing of a plurality of rotors, it is possible to suppress the ripple of the low voltage power supply 120 by performing control such that a period during which excitation currents of each of the motors increase and a period during which the excitation currents decrease do not match.

Third Embodiment

Next, a third embodiment will be described with a focus on differences from the first embodiment. FIG. 12 is a diagram illustrating position detection excitation processing on the motor 151 and the motor 152 in this embodiment. Note that, also in the following description, the motor 151 is also referred to as the motor #1, and the motor 152 is also referred to as the motor #2. In the first embodiment and the second embodiment, the frequencies of PWM signals in position detection excitation processing of a plurality of motors do not need to be the same, and it is not required to synchronize timings for switching the PWM signals (switching timing between a high level and a low level). In this embodiment, the frequencies of PWM signals in position detection excitation processing of a plurality of motors are the same, and the timings for switching the PWM signals are synchronized. Reference numerals 701 to 706 in FIG. 12 indicate the A period of excitation for the motor #1, and accordingly, the B period of excitation of the motor #2. Note that an X1-Y1 phase is excited regarding the motor #1, and an X2-Y2 phase is excited regarding the motor #2. In addition, a first sub period in the figure corresponds to a period during which a PWM signal for driving a high-side switching element is at a high level, and a second sub period corresponds to a period during which a PWM signal for driving a high-side switching element is at a low level. Therefore, the first sub period and the second sub period are alternately repeated.

The motor #1 corresponds to the A period, and thus, during the first sub period, the high-side switching element of an X1 phase is switched on, and the excitation current in the motor #1 increases. On the other hand, during the second sub period, the low-side switching element of the X1 phase is switched on, and the excitation current in the motor #1 decreases. On the other hand, the motor #2 corresponds to the B period, and thus, during both the first sub period and the second sub period, the excitation current in the motor #2 decreases. However, during the first sub period, the high-side switching element of a Y2 phase is switched on, and, during the second sub period, the low-side switching element of the Y2 phase is switched on, and thus the rate of reduction in the excitation current in the motor #2 during the first sub period is larger than that during the second sub period. Therefore, excitation currents in the motor #1 and the motor #2 change respectively as indicated by reference numerals 701 and 702 in FIG. 12. Specifically, the excitation current in the motor #1 increases as a whole while repeatedly increasing and decreasing for each sub period. On the other hand, the excitation current in the motor #2 constantly decreases, but the rate of reduction changes for each sub period.

Reference numerals 703 and 704 respectively indicate currents supplied from the low voltage power supply 120 to the motor #1 and the motor #2. An actual output current from the low voltage power supply 120 is acquired by totaling the currents indicated by reference numerals 703 and 704, and is as indicated by reference numeral 705. As indicated by reference numeral 705, similarly to the first embodiment, currents to a plurality of motors are cancelled, and change in an output current from the low voltage power supply 120 decreases. Thus, as indicated by reference numeral 706, the ripple of output voltage of the low voltage power supply 120 is suppressed.

In particular, in this embodiment, in order to synchronize PWM signals for exciting a plurality of motors, a period during which an excitation current in the motor #1 increases and a period during which an excitation current in the motor #2 decreases in a larger amount match. Thus, compared with a case where the PWM signals are set asynchronous to each other, it is possible to further suppress change in an output current of the low voltage power supply 120, and it is possible to further reduce the voltage ripple of the low voltage power supply 120.

Other Embodiments

Note that, in the above embodiments, the motor control unit 41, which is a constituent element of the image forming apparatus 10, is referred to as such, but the motor control unit 41 can also be an apparatus, and be referred to as a motor control apparatus. In addition, an apparatus that includes the control unit 40 and the motor control unit 41 can be a motor control apparatus. In addition, in the above embodiments, the motors 151 and 152 cause a rotating member related to image formation of the image forming apparatus 10 such as the photosensitive member 11 to rotate, but the present invention can also be applied to a motor for conveying the recording member P. In addition, the configuration of the motor 151 is not limited to the configuration shown in FIG. 4, and a motor with another pole number or another number of phases may also be adopted.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-008597, filed on Jan. 22, 2019 which is hereby incorporated by reference wherein in its entirety.

What is claimed is:

1. A motor control apparatus comprising:
an excitation unit configured to excite a plurality of excitation phases of each of a plurality of motors that include first to Nth motors (N is an integer of two or greater), based on an input voltage; and
a control unit configured to control the excitation unit and to detect rotor positions of the respective first to Nth motors,
wherein, in a case where detecting the rotor positions, a peak of excitation currents of the first motor does not overlap a peak of excitation currents of a second motor.

2. The motor control apparatus according to claim 1, wherein, when detecting rotor positions of the respective first to Nth motors, the control unit sets start timings of the detection excitation processing of the respective first to Nth motors to be different.

3. The motor control apparatus according to claim 1, wherein, after starting the detection excitation processing of a k-th motor (k is an integer of 1 to N−1), the control unit starts the detection excitation processing of a (k+1)th motor, and
a period from when the detection excitation processing of the first motor is started until when the detection excitation processing of the Nth motor is started is shorter than the excitation cycle.

4. The motor control apparatus according to claim 3, wherein the excitation period includes a first period during which an excitation current increases and a second period that follows the first period, and during which the excitation current decreases, and
the control unit starts the detection excitation processing on the respective first to Nth motors such that the second period of the k-th motor and the first period of the (k+1)th motor have an overlapping period.

5. The motor control apparatus according to claim 4, wherein N is 2, and
the excitation cycle is equal to the excitation period.

6. The motor control apparatus according to claim 5, wherein the first period and the second period are equal, and
the control unit delays a start timing of the detection excitation processing of a second motor relative to a start timing of the detection excitation processing of the first motor by the first period.

7. The motor control apparatus according to claim 4, wherein the excitation cycle is a sum of the excitation period and a non-excitation period, and
the non-excitation period is a period acquired by multiplying a period that is half of the excitation period by (N−2).

8. The motor control apparatus according to claim 7, wherein the first period and the second period are equal, and
the control unit delays a start timing of the detection excitation processing of the (k+1)th motor relative to a start timing of the detection excitation processing of the k-th motor by the first period.

9. The motor control apparatus according to claim 1, wherein an order in which the plurality of excitation phases are excited is the same for the first to Nth motors.

10. The motor control apparatus according to claim 1, wherein an order in which the plurality of excitation phases of at least one motor out of the first to Nth motors are excited is different from that of another motor.

11. The motor control apparatus according to claim 1, wherein the control unit detects the rotor position based on excitation currents when the plurality of excitation phases are excited.

12. An image forming apparatus comprising:
a rotating member for conveying a sheet along a conveyance path;
an image forming unit configured to form an image on the sheet that is conveyed on the conveyance path;
a plurality of motors that include first to Nth motors (N is an integer of two or greater) for driving the rotating member or the image forming unit; and
a motor control apparatus that controls the plurality of motors,
wherein the motor control apparatus includes:
an excitation unit configured to excite a plurality of excitation phases of each of a plurality of motors that include first to Nth motors (N is an integer of two or greater), based on an input voltage; and
a control unit configured to control the excitation unit, and to detect rotor positions of the respective first to Nth motors,
wherein, in a case where detecting the rotor positions, a peak of excitation currents of the first motor does not overlap a peak of excitation currents of a second motor.

* * * * *